(12) United States Patent
Chen

(10) Patent No.: US 12,447,657 B2
(45) Date of Patent: Oct. 21, 2025

(54) ELECTRIC MOULD OPENING AND CLOSING SYSTEM OF INJECTION MOULDING MACHINE

(71) Applicant: SUZHOU GIENKEE PLASTIC TECHNOLOGY CO. , LTD., Suzhou (CN)

(72) Inventor: Minghua Chen, Suzhou (CN)

(73) Assignee: SUZHOU GIENKEE PLASTIC TECHNOLOGY CO. , LTD., Suzhou (CN)

( * ) Notice: Subject to any disclaimer, the term of this patent is extended or adjusted under 35 U.S.C. 154(b) by 369 days.

(21) Appl. No.: 18/180,561

(22) Filed: Mar. 8, 2023

(65) Prior Publication Data

US 2023/0219271 A1 Jul. 13, 2023

Related U.S. Application Data

(63) Continuation of application No. PCT/CN2020/136094, filed on Dec. 14, 2020.

(30) Foreign Application Priority Data

Sep. 9, 2020 (CN) .......................... 202010943740.4

(51) Int. Cl.
*B29C 45/03* (2006.01)
*B29C 45/17* (2006.01)
*B29C 45/64* (2006.01)
*B29C 45/66* (2006.01)

(52) U.S. Cl.
CPC .............. *B29C 45/03* (2013.01); *B29C 45/64* (2013.01); *B29C 45/66* (2013.01); *B29C 2045/1792* (2013.01)

(58) Field of Classification Search
CPC ......... B29C 45/03; B29C 45/64; B29C 45/66; B29C 2045/1792
See application file for complete search history.

(56) References Cited

U.S. PATENT DOCUMENTS

| 4,968,239 A * | 11/1990 | Inaba ...................... B29C 45/66 |
| | | 425/451.2 |
| 2003/0003178 A1* | 1/2003 | Kami ................... B22D 17/266 |
| | | 425/451.2 |

* cited by examiner

*Primary Examiner* — Jerzi H Moreno Hernandez
(74) *Attorney, Agent, or Firm* — HAUPTMAN HAM, LLP

(57) ABSTRACT

Disclosed is an electric mould opening and closing system for an injection moulding machine, includes a mould opening and closing driving device including a mould transferring mechanism, a brake mechanism, a mould clamping mechanism and a brake auxiliary mechanism having a first state and a second state. When opening or closing mould, driven by the mould transferring mechanism, the brake auxiliary mechanism and the mould transferring mechanism make the movable plate move forward or backward in a horizontal direction, and the mould transferring mechanism is separated from the mould clamping mechanism by the brake auxiliary mechanism, and the brake auxiliary mechanism is in the first state. When braking, a linkage is formed between the brake mechanism and the mould transferring mechanism, the brake auxiliary mechanism is in the second state, and the mould clamping mechanism locks the movable plate.

10 Claims, 3 Drawing Sheets

ELECTRIC MOULD OPENING AND CLOSING SYSTEM OF INJECTION MOULDING MACHINE

RELATED APPLICATIONS

The present application is a Continuation of International Application Number PCT/CN2020/136094 filed Dec. 14, 2020, and claims priority to Chinese Application Number 202010943740.4 filed Sep. 9, 2020, the disclosures of which are hereby incorporated by reference herein in their entireties.

FIELD OF TECHNOLOGY

The present disclosure belongs to the field of mould opening and closing equipment, and specifically relates to an electric mould opening and closing system for an injection moulding machine.

BACKGROUND

At present, mould closing process of a two-plate injection moulding machine generally adopts hydraulic transmission, wherein the mould closing process includes mould transferring process and the clamping process (also known as braking), specifically, the mould transferring process includes using a mould transferring cylinder to push a mould plate to move, through position control, stopping the mould transferring cylinder after reaching a braking position, driving a brake plate via a braking cylinder to close, and fixing it on the thread of a pull rod of a high-pressure cylinder, and then clamping the mould through the high-pressure cylinder.

Clearly, the above mould closing process has the following defects:
1) the accuracy of the mould transferring cylinder is restricted, and as a result, it also reduces the mould positioning accuracy and mould opening and closing repeatability;
2) the opening and closing of the mould transferring cylinder and the brake plate are implemented separately and independently during the mould closing process, thus increasing the idle cycle period (dry cycle) of the injection moulding machine itself.

SUMMARY

The technical problem to be solved by the present application is to overcome the deficiencies of the prior art, and an improved electric mould opening and closing system for an injection moulding machine is provide.

To solve the above technical problems, a technical solution employed by the present disclosure is as follows:
an electric mould opening and closing system for an injection moulding machine, comprises a body, a fixed plate, a movable plate, and a mould opening and closing driving device, wherein the mould opening and closing driving device comprises a mould transferring mechanism for driving the movable plate to move forward and backward in a horizontal direction relative to the fixed plate, a brake mechanism for driving a nut on the movable plate to lock, and a mould clamping mechanism for locking the movable plate, in particular, the mould opening and closing driving device further comprises a brake auxiliary mechanism having a first state and a second state,
when opening or closing mould, driven by the mould transferring mechanism, the brake auxiliary mechanism and the mould transferring mechanism make the movable plate move forward or backward in a horizontal direction, and the mould transferring mechanism is separated from the mould clamping mechanism by the brake auxiliary mechanism, and the brake auxiliary mechanism is in the first state;
when braking, a linkage is formed between the brake mechanism and the mould transferring mechanism, the braking process and the closing mould process end simultaneously, the mould clamping mechanism locks the movable plate tightly, and the brake auxiliary mechanism is in the second state.

Preferably, a braking module rotating around a moving direction of the movable plate is formed on the movable plate, and the mould clamping mechanism comprises a mould clamping rod crossing the movable plate and the braking module, and a mould clamping power unit driving the mould clamping rod to drive the movable plate to move transversely, and when opening or closing mould, the braking module moves linearly relative to the mould clamping rod; and after braking, the braking module is fixed relative to the mould clamping rod.

According to a specific implementation and preferred aspect of the present disclosure, a first fitting part and a second fitting part are formed on an outer periphery of the mould clamping rod and an inner wall of the braking module respectively, when closing mould, the first fitting part and the second fitting part are staggered with each other, and the braking module moves linearly relative to the mould clamping rod; when braking, the first fitting part and the second fitting part are engaged with each other, and a distance where the movable plate go forward equal to a distance where the braking module rotate forward. The advantage of this configuration is that the movable plate can move to a set position normally before braking, and when braking, the whole braking process is simple and fast.

Specifically, the first fitting part is a fitting groove recessed inward from the outer periphery of the mould clamping rod; the second fitting part is a fitting projection formed on the inner wall of the braking module, when closing mould, the fitting projection moves within the fitting groove; when braking, the fitting projection and the fitting groove are engaged with each other. The fitting groove comprises an extending groove extending along a length direction of the mould clamping rod, and an engaging groove located at the outer periphery of the mould clamping rod and communicated with the extending groove, and the fitting projection is engaged with the engaging groove when braking.

According to another specific implementation and preferred aspect of the present disclosure, there are four groups of braking modules, which are arranged square in shape on the movable plate, and mould clamping mechanisms one-to-one corresponding to the braking modules are provided.

Specifically, each braking module has a brake carrier rotatably connected to the movable plate, and a transmission gear arranged on an outer periphery of the brake carrier, wherein two transmission gears of two braking modules on the same side are synchronously connected via a rack; there are two braking auxiliary mechanisms arranged on two braking modules on a diagonal of the square, wherein each braking auxiliary mechanism comprises a clutch part arranged on the outer periphery of the brake carrier, the clutch part has a first mode and a second mode, and when in the first mode, the mould transferring mechanism is connected to the braking modules in a transmission way; and when in the second mode, the mould transferring mechanism is disengaged from the braking modules.

According to yet another specific implementation and preferred aspect of the present disclosure, the outer peripheries of the brake carriers are further provided with braking gears, and mould transferring mechanisms one-to-one corresponding to the clutch parts are provided, each mould transferring mechanism has a screw rod extending along the length direction of the mould clamping rod, said nut fitting the screw rod, and a driving part driving the nut to rotate, wherein connecting lugs are fixedly provided on opposite sides of the movable plate, each screw rod passes through one of the connecting lugs, and each nut is connected to one of the connecting lugs via an external connector. The advantage of this configuration is that through the fitting of the screw rods and the gears, the transmission are more stable and reliable.

Specifically, each driving part comprises a first gear arranged on an outer periphery of the nut, a motor arranged on the connecting lug, and a second gear connecting a motor output shaft to the first gear in a transmission way, and when closing the mould, the first gear and the braking gear are staggered with each other; when braking, the braking gear is engaged with or separated from the first gear with each other as the movement of the clutch part.

In addition, the body comprises an underframe, a tail frame arranged on an end portion of the underframe away from the movable plate; a plurality of connecting rods with end portions fixed on the mould clamping rod and another end portions fixed with the tail frame; and a sliding rail arranged on the underframe and extending along the length direction of the mould clamping rod, wherein mould clamping rods one-to-one corresponding to the connecting rods are provided, the movable plate and the tail frame are slidably arranged at the bottom on the sliding rail, the screw rods are connected at one end portion to the tail frame or the screw rods are connected to the mould clamping rods.

Due to the implementation of the above technical solutions, the present disclosure has the following advantages over the conventional art:

the present disclosure uses the brake auxiliary mechanism to link the mould transferring mechanism with the brake mechanism to quickly link mould transferring and mould clamping operations, such that the process is simple and rapid, and the positioning accuracy of mould and the repeatability of mould opening and closing can be effectively improved, and additionally, the idle cycle period (dry cycle) of the injection moulding machine itself is also shortened.

BRIEF DESCRIPTION

REFERENCE NUMBERS

Figure 1:
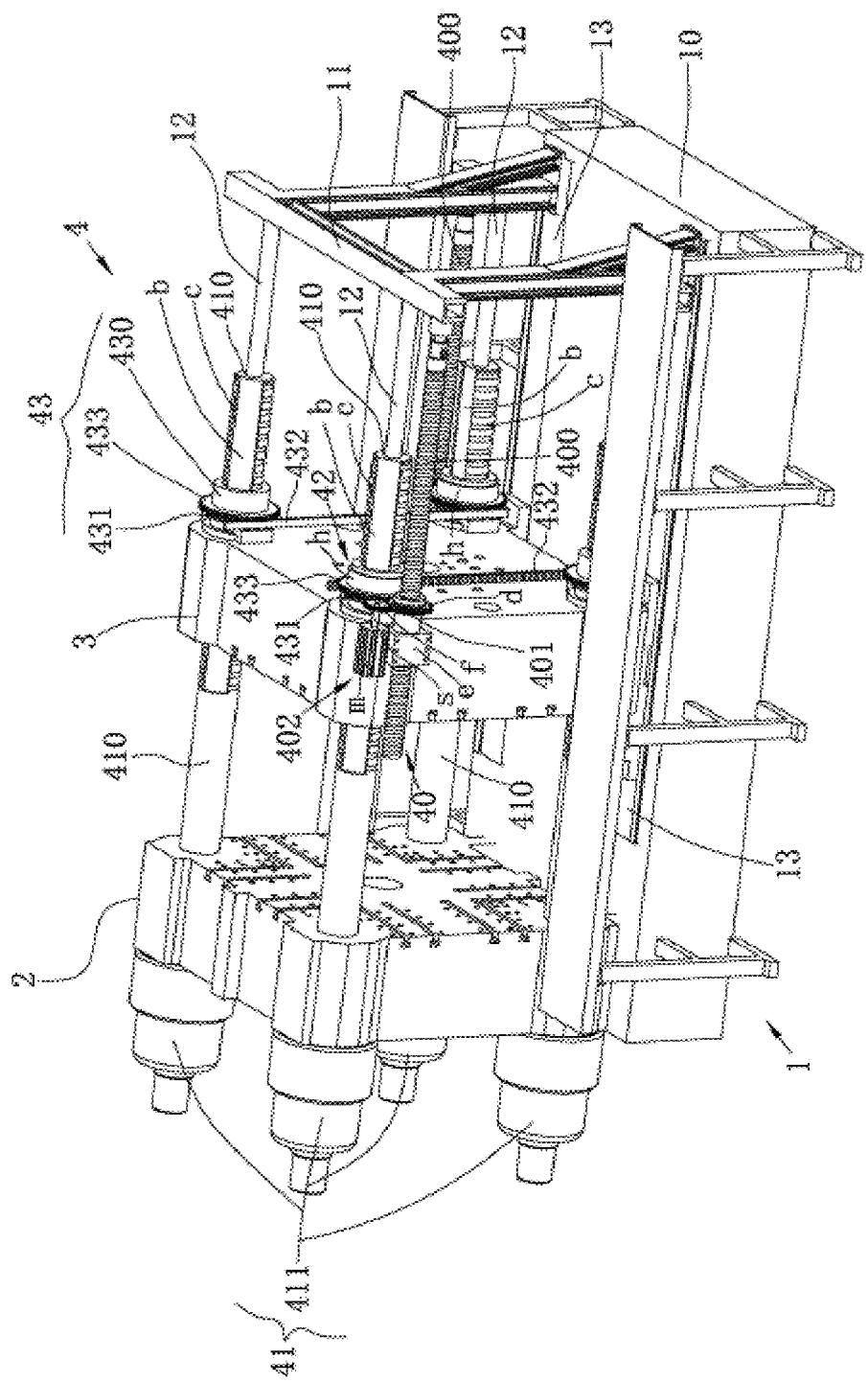
FIG. 1 is a schematic diagram of an electric mould opening and closing system for an injection moulding machine of the present disclosure.

1—body; 10—underframe; 11—tail frame; 12—connecting rod; 13—sliding rail;
2—fixed plate;
3—movable plate; e—connecting lug;
4—mould opening and closing driving device;
40—mould transferring mechanism; 400—screw rod; 401—nut; d—first gear; 402—driving part; m—motor; s—motor output shaft; f—second gear; 41—mould clamping mechanism; 410—mould clamping rod; b—extending groove; c—engaging groove; 411—mould clamping cylinder; 42—braking auxiliary mechanism; h—clutch; 43—braking module; 430—brake carrier; 431—transmission gear; 432—rack; 433—braking gear; a—projection.

DETAILED DESCRIPTION OF EXEMPLARY EMBODIMENTS

In order to make the above objects, features and advantages of the present application more clearly understood, the present application will be described in detail below with reference to the accompanying drawings and specific embodiments. In the following description, numerous specific details are set forth in order to provide a thorough understanding of the present application. However, the present application can be implemented in many other ways different from those described herein, and those skilled in the art can make similar improvements without departing from the connotation of the present application, therefore, the present application is not limited by the specific embodiments disclosed below.

In the description of the present application, it should be noted that the orientation or positional relationship indicated by the terms "center", "longitudinal direction", "transverse direction", "length", "width", "thickness", "up", "down", "front", "rear", "left", "right", "vertical", "horizontal", "top", "bottom", "inner", "outer", "clockwise", "anticlockwise", "axial direction", "radial direction", "circumferential direction" and the like is based on the orientation or positional relationship shown in the accompanying drawings, is only for the convenience of describing the present application and simplifying the description, rather than indicating or implying that the indicated device or element must have a particular orientation, be constructed and operate in a particular orientation, and therefore should not be construed as limiting the present application.

Furthermore, the terms "first" and "second" are used for descriptive purposes only and should not be construed to indicate or imply relative importance, or implicitly indicate the number of technical features indicated. Therefore, the features defined with "first" and "second" may explicitly or implicitly include at least one such feature. In the description of the present application, "a plurality of" means at least two, such as two, three, etc., unless otherwise expressly and specifically defined.

In the present disclosure, unless otherwise expressly specified and limited, the terms "arrange", "contact", "connect", "fix" and other terms should be understood in a broad sense, for example, it may be fixedly connected or detachably connected, or integrated; it may be mechanically connected or electrically connected; it can be directly connected or indirectly connected through an intermediate medium, or it can be the internal communication of two elements or the interaction relationship between two elements. For those of ordinary skill in the art, the specific meanings of the above terms in the present disclosure can be understood according to specific situations.

In the disclosure, unless otherwise expressly specified and limited, a first feature "on" or "under" a second feature may mean that the first feature is in direct contact with the second feature, or the first feature is in indirect contact with the second feature through an intermediate medium. Also, the first feature being "on", "above", "over" the second feature may mean that the first feature is directly above or obliquely above the second feature, or simply means that the first feature is level higher than the second feature. The first feature being "under", "below" and "underneath" the second feature may mean that the first feature is directly below or obliquely below the second feature, or simply means that the first feature has a lower level than the second feature.

It should be noted that when an element is referred to as being "fixed on" or "disposed on" another element, it can be directly on the other element or intervening elements may also be present. When an element is referred to as being "connected to" another element, it can be directly connected to the other element or intervening elements may also be present. The terms "vertical", "horizontal", "up", "down", "left", "right" and similar expressions used herein are for illustrative purposes only and are not meant to be the only implementation.

As shown in FIG. 1, an electric mould opening and closing system for an injection moulding machine of this embodiment comprises a body 1, a fixed plate 2, a movable plate 3, and a mould opening and closing driving device 4.

Specifically, the body 1 comprises an underframe 10, a tail frame 11 arranged on a right end of the underframe 10, four connecting rods 12 fixed on the tail frame 11 at their right end portions and extending horizontally, and a sliding rail 13 arranged on the underframe 10 and extending along a length direction of the connecting rods 12.

The fixed plate 2 is fixedly arranged on a left end portion of the underframe 10 away from the tail frame 11 at the bottom.

The movable plate 3 is slidably arranged on the sliding rail 13 at the bottom, and connecting lugs e are fixedly provided on opposite sides of the movable plate 3.

The tail frame 11 is slidably arranged on the sliding rail 13 at the bottom.

Figure 2:
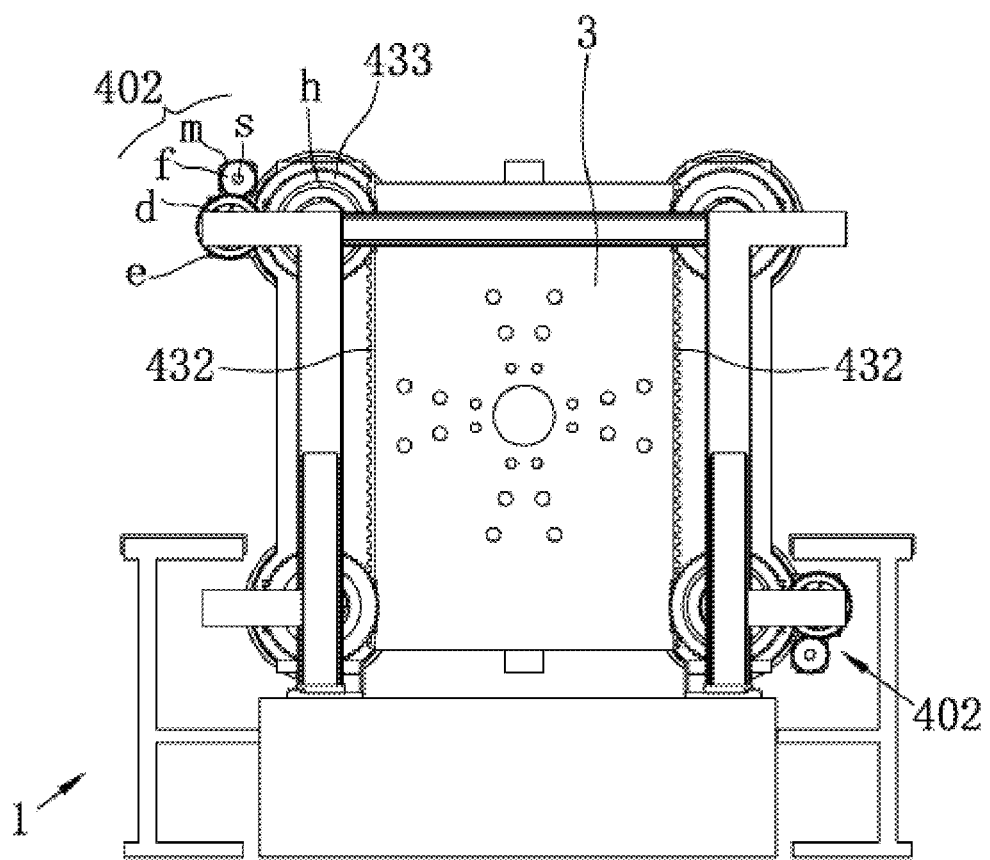
FIG. 2 is a right-side view of FIG. 1.

Combining with FIG. 2, the mould opening and closing driving device 4 comprises a mould transferring mechanism 40 for driving the movable plate 3 to move transversely relative to the fixed plate 2, a mould clamping mechanism 41 for driving the braking and clamping of the movable plate 3 relative to the fixed plate 2, a braking auxiliary mechanism 42, and a braking module 43 formed on the movable plate 3 and rotating around a moving direction of the movable plate 3. There are four groups of braking modules 43, which are arranged square in shape on the movable plate 3.

Figure 3:
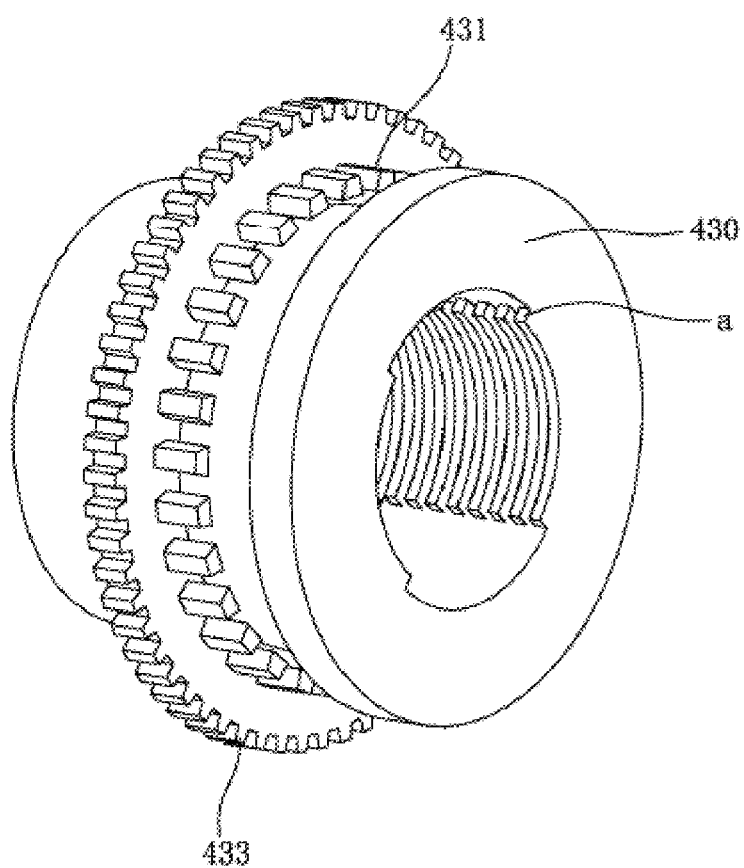
FIG. 3 is a schematic diagram of the braking module shown in FIG. 1.

Combining with FIG. 3, each braking module 43 has a brake carrier 430 rotatably connected to the movable plate 3, and a transmission gear 431 and a braking gear 433 arranged on the outer periphery of the brake carrier 430, wherein the brake carrier 430 is in the shape of a hollow column, and is provided with two groups of opposite projections a on the inner wall, each group of projections a is distributed in an array along the axial direction of the brake carrier 430.

In order to realize the synchronous movement of two groups, namely upper and lower groups of brake modules 43, racks 432 are used to synchronize the transmission of the upper and lower transmission gears 431 on the same side. In other embodiments, mechanisms with other forms can be apply to realize the synchronous movement of different brake modules 43, such as belt pulley transmission, gear drive, and so on.

The mould clamping mechanism 41 comprises a mould clamping rod 410 crossing the movable plate 3 and the brake carrier 430, and a mould clamping cylinder 411 driving the mould clamping rod 410 to drive the movable plate 3 to move transversely.

In this embodiment, there are four groups of mould clamping mechanisms 41, which are one-to-one corresponding to the four groups of braking modules 43.

The mould clamping rods 410 pass through the brake carriers 430, and are fixedly connected to the left end portions of the corresponding connecting rods 12.

Specifically, each mould clamping rod 410 is provided with an extending groove b extending along the length direction of the mould clamping rod 410, and an engaging groove c located at the outer periphery of the mould clamping rod 410 and communicated with the extending groove b.

In this embodiment, the extending grooves b are located on two opposite sides of the mould clamping rods 410, so that the portions of the mould clamping rods 410 that penetrates the brake carriers 430 is flat and the engaging grooves c are located on two opposite sides to the flat. When closing the mould, the projections a move within the extending grooves b, and the braking modules 43 move linearly relative to the mould clamping rods 410; when braking, the projections a rotate, and engage the engaging grooves c, a distance where the movable plate 3 go forward equal to a distance where the braking modules 43 rotate forward; after braking, the braking modules 43 are fixed relative to the mould clamping rods 410. The advantage of this configuration is that the movable plate 3 can move to a set position normally before braking, and when braking, the whole braking process is simple and fast.

In this embodiment, the projections a are in the shape of spiral, and the engaging grooves c fit with them.

In this embodiment, there are two groups of mould transferring mechanisms 40, with each arranged on one side of one of the two braking modules 43 arranged on a diagonal of the square respectively.

Specifically, each mould transferring mechanism 40 has a screw rod 400 extending along the length direction of the mould clamping rod 410 and passing through the connecting lug e, a nut 401 fitting with the screw 400 and connected to the connecting lug e, and a driving part 402 driving the nut 401 to rotate, wherein the nut 401 is connected to the connecting lug e via an external connector. The advantage of this configuration is that through the fitting of the screw rods 400 and the gears, the transmission are more stable and reliable. In this embodiment, the screw rods 400 are connected to the tail frame 11 at their right end portions; each driving part 402 comprises a first gear d arranged on the outer periphery of the nut 401, a motor m arranged on the connecting lug e, and a second gear f connecting a motor output shaft s to the first gear d in a transmission way.

In this embodiment, there are two braking auxiliary mechanisms 42 arranged on two braking modules 43 on a diagonal of the square respectively, wherein each braking auxiliary mechanism 42 comprises a clutch h arranged on the outer periphery of the brake carrier 430.

Specifically, the clutches h are arranged one to one corresponding to the mould transferring mechanisms 40, and have a first mode and a second mode, and when the clutches h are in the first mode, the braking gears 433 are connected to the first gears d in a transmission way; and when in the second mode, the braking gears 433 are disengaged from the first gears d. In this embodiment, although the specific configuration of the clutches h is not described specifically, the main reason for this is that the clutches h are purchased parts, and it is easy to implement the switch between the engagement and disengagement of the braking gears 433 and the first gears d corresponding to the clutch state of the clutch h, therefore, it will not be described here.

In summary, the implementation process of this embodiment is as follows:

when closing the mould, the motors m drive through the gears by engaged transmission to make the nuts 401 on the screw rods rotate and move in the direction of the length of the screw rods 400, which in turn pushes the connecting lugs e fixed on the movable plate 3 to move forward, so that the movable plate 3 moves closer to the fixed plate 2 until it moves to the set position to complete the closing of the mould;

when braking, the clutches h operate, the braking gears 433 arranged on the brake carriers 430 engage the first gears d on the nuts 401, and the braking gears 433 rotate, so that the projections a on the inner wall of the brake carriers 430 engage the engaging grooves c on the mould clamping rods 410, and the mould clamping cylinders 411 operate to lock tightly, and the clutches h operate again to disengage the braking gears 433 from the first gears d and complete the braking process.

As for opening the mould, the mould clamping cylinders 411 stop the tensioning action and the motors m rotate reversely, then the clutches h work to make the braking gears 433 engage the first gears d again, and when the braking gears 433 rotate reversely and the projections a are staggered with the engaging grooves c, the clutches h make the braking gears 433 staggered with the first gears d, and the nuts 401 drive the movable plate 3 to move back along the length of the screw rods 400.

Therefore, this embodiment has advantages as follows:

this embodiment uses the brake auxiliary mechanism 42 to link the mould transferring mechanism 40 with the brake mechanism to quickly link mould transfer and mould clamping operations, such that the process is simple and rapid, and the positioning accuracy of mould and the repeatability of mould opening and closing can be effectively improved, and additionally, the idle cycle period (dry cycle) of the injection moulding machine itself is also shortened.

The above detailed describes the present disclosure, and is intended to make those skilled in the art being able to understand the present disclosure and thereby implement it, and should not be concluded to limit the protective scope of this disclosure. Any equivalent variations or modifications according to the essence of the present disclosure should be covered by the protective scope of the present disclosure.

I claim:

1. An electric mould opening and closing system for an injection moulding machine, comprising a body, a fixed plate, a movable plate, and a mould opening and closing driving device, wherein the mould opening and closing driving device comprises
   a mould transferring mechanism for driving the movable plate to move back and forth in a horizontal direction relative to the fixed plate, the mould transferring mechanism comprises a screw rod extending along a length direction of a mould clamping rod and a nut fitting the screw rod;
   a braking module for driving the movable plate to lock relative to the fixed plate, the braking module rotates around a moving direction of the movable plate and is formed on the movable plate;
   a mould clamping mechanism for locking the movable plate, to the fixed plate, the mould clamping mechanism comprises the mould clamping rod and a mould clamping cylinder, the mould clamping rod crosses the movable plate and the braking module, the mould clamping cylinder drives the mould clamping rod to drive the movable plate to move transversely; and
   a brake auxiliary mechanism, the brake auxiliary comprises a clutch, the clutch has a first mode and a second mode, when in the first mode, the mould transferring mechanism is connected to the braking module; and when in the second mode, the mould transferring mechanism is disengaged from the braking module;
   when the movable plate is opened or closed relative to the fixed plate, the braking module moves linearly relative to the mould clamping rod, driven by the mould transferring mechanism, the brake auxiliary mechanism and the mould transferring mechanism make the movable plate move forward or backward in the horizontal direction, and the mould transferring mechanism is separated from the mould clamping mechanism by the brake auxiliary mechanism;
   when braking, a linkage is formed between the braking module and the mould transferring mechanism, the mould clamping mechanism locks the movable plate tightly;
   after braking, the braking module is fixed relative to the mould clamping rod.

2. The electric mould opening and closing system for the injection moulding machine according to claim 1, wherein a first fitting part and a second fitting part are formed on an outer periphery of the mould clamping rod and an inner wall of the braking module respectively, when the movable plate is closed relative to the fixed plate, the first fitting part and the second fitting part are staggered with each other, and the braking module moves linearly relative to the mould clamping rod; when braking, the first fitting part and the second fitting part are engaged with each other, and a distance where the movable plate goes forward is equal to a distance where the braking module rotates forward.

3. The electric mould opening and closing system for the injection moulding machine according to claim 2, wherein the first fitting part is a fitting groove recessed inward from the outer periphery of the mould clamping rod; the second fitting part is a fitting projection formed on the inner wall of the braking module, when the movable plate is closed relative to the fixed plate, the fitting projection moves within the fitting groove; when braking, the fitting projection and the fitting groove are engaged with each other.

4. The electric mould opening and closing system for the injection moulding machine according to claim 3, wherein the fitting groove comprises an extending groove extending along a length direction of the mould clamping rod, and an engaging groove located at the outer periphery of the mould clamping rod and communicated with the extending groove, and the fitting projection is engaged with the engaging groove when braking.

5. The electric mould opening and closing system for the injection moulding machine according to claim 1, wherein there are four groups of braking modules, which are arranged square in shape on the movable plate, and mould clamping mechanisms one-to-one corresponding to the braking modules are provided.

6. The electric mould opening and closing system for the injection moulding machine according to claim 5, wherein each braking module has a brake carrier rotatably connected to the movable plate and a transmission gear arranged on an outer periphery of the brake carrier, wherein two transmission gears of two braking modules on the same side are synchronously connected via a rack.

7. The electric mould opening and closing system for the injection moulding machine according to claim 6, wherein there are two braking auxiliary mechanisms arranged on two braking modules on a diagonal of the square, wherein each braking auxiliary mechanism comprises the clutch arranged on an outer periphery of the brake carrier.

8. The electric mould opening and closing system for the injection moulding machine according to claim 7, wherein outer peripheries of the brake carriers are further provided with braking gears, two clutches, and mould transferring mechanisms one-to-one corresponding to the clutches are provided.

9. The electric mould opening and closing system for the injection moulding machine according to claim 8, wherein each mould transferring mechanism has a driving part driving the nut to rotate, wherein connecting lugs are fixedly provided on opposite sides of the movable plate, the screw rod passes through one of the connecting lugs, and the nut is connected to one of the connecting lugs via an external connector, wherein the driving part comprises a first gear arranged on an outer periphery of the nut, a motor arranged on one of the connecting lugs, and a second gear connecting a motor output shaft to the first gear, and when the movable plate is opened or closed relative to the fixed plate, the first gear and each braking gear are staggered with each other; and when braking, each braking gear is engaged with or separated from the first gear with each other as the movement of the clutch.

10. The electric mould opening and closing system for the injection moulding machine according to claim 9, wherein the body comprises an underframe, a tail frame arranged on an end portion of the underframe away from the movable plate; a plurality of connecting rods with end portions fixed on the mould clamping rod and another end portions fixed on the tail frame; and a sliding rail arranged on the underframe and extending along the length direction of the mould clamping rod, wherein mould clamping rods one-to-one corresponding to the connecting rods are provided, the movable plate and the tail frame are slidably arranged at the bottom on the sliding rail, the screw rods are connected at one end portion to the tail frame or the screw rods are connected to the mould clamping rods.

* * * * *